(12) United States Patent
Brand

(10) Patent No.: US 10,754,826 B2
(45) Date of Patent: Aug. 25, 2020

(54) TECHNIQUES FOR SECURELY SHARING FILES FROM A CLOUD STORAGE

(71) Applicant: CTERA Networks, LTD., Petach-Tikva (IL)

(72) Inventor: Aron Brand, Petach-Tikva (IL)

(73) Assignee: CTERA NETWORKS, LTD., Petach-Tikva (IL)

( * ) Notice: Subject to any disclaimer, the term of this patent is extended or adjusted under 35 U.S.C. 154(b) by 118 days.

(21) Appl. No.: 15/355,466

(22) Filed: Nov. 18, 2016

(65) Prior Publication Data
US 2017/0147600 A1    May 25, 2017

Related U.S. Application Data

(60) Provisional application No. 62/257,498, filed on Nov. 19, 2015.

(51) Int. Cl.
| | |
|---|---|
| *H04L 29/06* | (2006.01) |
| *G06F 16/176* | (2019.01) |
| *G06Q 10/10* | (2012.01) |
| *G06F 16/182* | (2019.01) |
| *H04L 29/08* | (2006.01) |

(52) U.S. Cl.
CPC .......... *G06F 16/176* (2019.01); *G06F 16/182* (2019.01); *G06Q 10/10* (2013.01); *G06Q 10/107* (2013.01); *H04L 63/083* (2013.01); *H04L 63/0823* (2013.01); *H04L 67/02* (2013.01); *H04L 67/06* (2013.01)

(58) Field of Classification Search
CPC ......... G06F 17/30165; G06F 17/30194; H04L 63/083
See application file for complete search history.

(56) References Cited

U.S. PATENT DOCUMENTS

| | | | |
|---|---|---|---|
| 7,054,905 B1 * | 5/2006 | Hanna ................. | G06Q 10/107 709/206 |
| 8,434,133 B2 | 4/2013 | Kulkarni et al. | |
| 2004/0186894 A1 * | 9/2004 | Jhingan ............... | G06Q 10/107 709/207 |
| 2005/0188026 A1 * | 8/2005 | Hilbert ................ | H04L 51/063 709/206 |

(Continued)

Primary Examiner — Chau Le
Assistant Examiner — Vance M Little
(74) Attorney, Agent, or Firm — M&B IP Analysts, LLC

(57) ABSTRACT

A system and method for securely sharing files from a cloud storage are provided. The method includes capturing an electronic message sent by a client device, the electronic message designating at least one recipient, wherein the electronic message includes at least one attachment; identifying the at least one attachment and the at least one recipient designated in the electronic message; sending, to a cloud storage system (CSS), a list indicating the identified at least one recipient; receiving, from the CSS, a link to a shared folder, wherein the shared folder is in the CSS; replacing, in the electronic message, the at least one attachment with the received link; uploading, to the shared folder, at least one of the at least one attachment; and sending, to the at least one recipient, the electronic message with the replaced link, wherein at least one authentication procedure is applied for one of the at least one recipient upon activation of the replaced link by the recipient.

18 Claims, 11 Drawing Sheets

(56) References Cited

U.S. PATENT DOCUMENTS

| | | | |
|---|---|---|---|
| 2006/0041755 A1* | 2/2006 | Pemmaraju | G06F 21/32 |
| | | | 713/182 |
| 2010/0211637 A1 | 8/2010 | Borzsei et al. | |
| 2012/0278405 A1* | 11/2012 | Costenaro | H04L 51/08 |
| | | | 709/206 |
| 2013/0238705 A1* | 9/2013 | Weller | G06Q 10/101 |
| | | | 709/204 |
| 2014/0095871 A1 | 4/2014 | Hoard et al. | |
| 2015/0066877 A1* | 3/2015 | Lillibridge | G06F 3/0641 |
| | | | 707/692 |
| 2015/0264111 A1* | 9/2015 | Aleksandrov | H04L 51/08 |
| | | | 726/4 |
| 2015/0281460 A1 | 10/2015 | Chandak et al. | |
| 2015/0288701 A1* | 10/2015 | Brand | H04L 63/102 |
| | | | 726/7 |

* cited by examiner

TECHNIQUES FOR SECURELY SHARING FILES FROM A CLOUD STORAGE

CROSS-REFERENCE TO RELATED APPLICATIONS

This Application claims the benefit of U.S. Provisional Patent Application No. 62/257,498 filed on Nov. 19, 2015, the contents of which are hereby incorporated by reference.

TECHNICAL FIELD

The present disclosure relates generally to systems and methods for sharing files stored via cloud storage, and more specifically to securely sharing files from a cloud storage.

BACKGROUND

In file-based collaboration systems, it is common to allow sharing of files via "invitation links" to grant access to files and folders. Such systems may allow one user to send a link (e.g., in the form of a URL) to another user over e-mail, social networking websites, or any other communication medium. The other user may view or modify the contents of the file or folder by clicking on the link. The invitation links can be generated by a plug-in or processed running at a web-browser or an email application (e.g., Outlook®). For example, a user can select one or more attachments, and a link to the attachments is generated and sent by email.

The links are often sent to a group of users who are the intended recipients. The link or invitation is typically not coded to uniquely designate the recipients. Therefore, the link (embedded in an email) can be mistakenly forwarded to an un-intended recipient or forwarded by an authorized user to an unauthorized user. In addition, a hacker who duplicitously gained access to emails containing such links can easily download and view documents pointed to by the link. Furthermore, it is difficult or impossible to distinguish such malicious use of the invitation from legitimate use by the intended recipient.

Therefore, although it is easy and convenient to share documents via links or invitations, such solutions are often not sufficiently secure and can be easily compromised. Furthermore, such solutions do not ensure that documents pointed to by a shared link are not accessed by unauthorized users.

Some existing solutions attempt to provide a security layer to such links or emails. One solution is based on authentication that either requires the recipient to register a user account in the system or to previously own such an account. This is not always a desirable requirement for "ad-hoc" collaboration. It is often desirable to invite external users to a corporate system in which they do not have an account. Furthermore, it may be prohibitive or otherwise inconvenient for the recipient to go through the complex process of registering a new user account, dealing with the overhead of remembering another password, and so on.

It would therefore be advantageous to provide a solution for securely providing email attachments that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for securely sharing files from a cloud storage. The method comprises: capturing an electronic message sent by a client device, the electronic message designating at least one recipient, wherein the electronic message includes at least one attachment; identifying the at least one attachment and the at least one recipient designated in the electronic message; sending, to a cloud storage system (CSS), a list indicating the identified at least one recipient; receiving, from the CSS, a link to a shared folder, wherein the shared folder is in the CSS; replacing, in the electronic message, the at least one attachment with the received link; uploading, to the shared folder, at least one of the at least one attachment; and sending, to the at least one recipient, the electronic message with the replaced link, wherein at least one authentication procedure is applied for one of the at least one recipient upon activation of the replaced link by the recipient.

Certain embodiments disclosed herein also include a system for securely sharing files from a cloud storage. The system comprises: a processing circuitry; and a memory, the memory containing instructions that, when executed by the processing circuitry, configure the system to: capture an electronic message sent by a client device, the electronic message designating at least one recipient, wherein the electronic message includes at least one attachment; identify the at least one attachment and the at least one recipient designated in the electronic message; send, to a cloud storage system (CSS), a list indicating the identified at least one recipient; receive, from the CSS, a link to a shared folder, wherein the shared folder is in the CSS; replace, in the electronic message, the at least one attachment with the received link; upload, to the shared folder, at least one of the at least one attachment; and send, to the at least one recipient, the electronic message with the replaced link, wherein at least one authentication procedure is applied for one of the at least one recipient upon activation of the replaced link by the recipient.

Certain embodiments disclosed herein also include a method for securely sharing files from a cloud storage. The method comprises: receiving, from a client device, a list of recipients for an electronic message; creating a shared folder; sending, to the client device, a link to the shared folder; receiving, from a user device, at least one identifier, wherein the at least one identifier is received in response to a user of the user device accessing the sent link; determining, based on the at least one identifier, whether the user is among the list of recipients; and authenticating, based on the received at least one identifier, the user of the user device.

Certain embodiments disclosed herein also include a system for securely sharing files from a cloud storage. The system comprises: a processing circuitry; and a memory, the memory containing instructions that, when executed by the processing circuitry, configure the system to: receive, from a client device, a list of recipients for an electronic message; create a shared folder; send, to the client device, a link to the shared folder; receive, from a user device, at least one identifier, wherein the at least one identifier is received in response to a user of the user device accessing the sent link; determine, based on the at least one identifier, whether the user is among the list of recipients; and authenticate, based on the received at least one identifier, the user of the user device.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1:
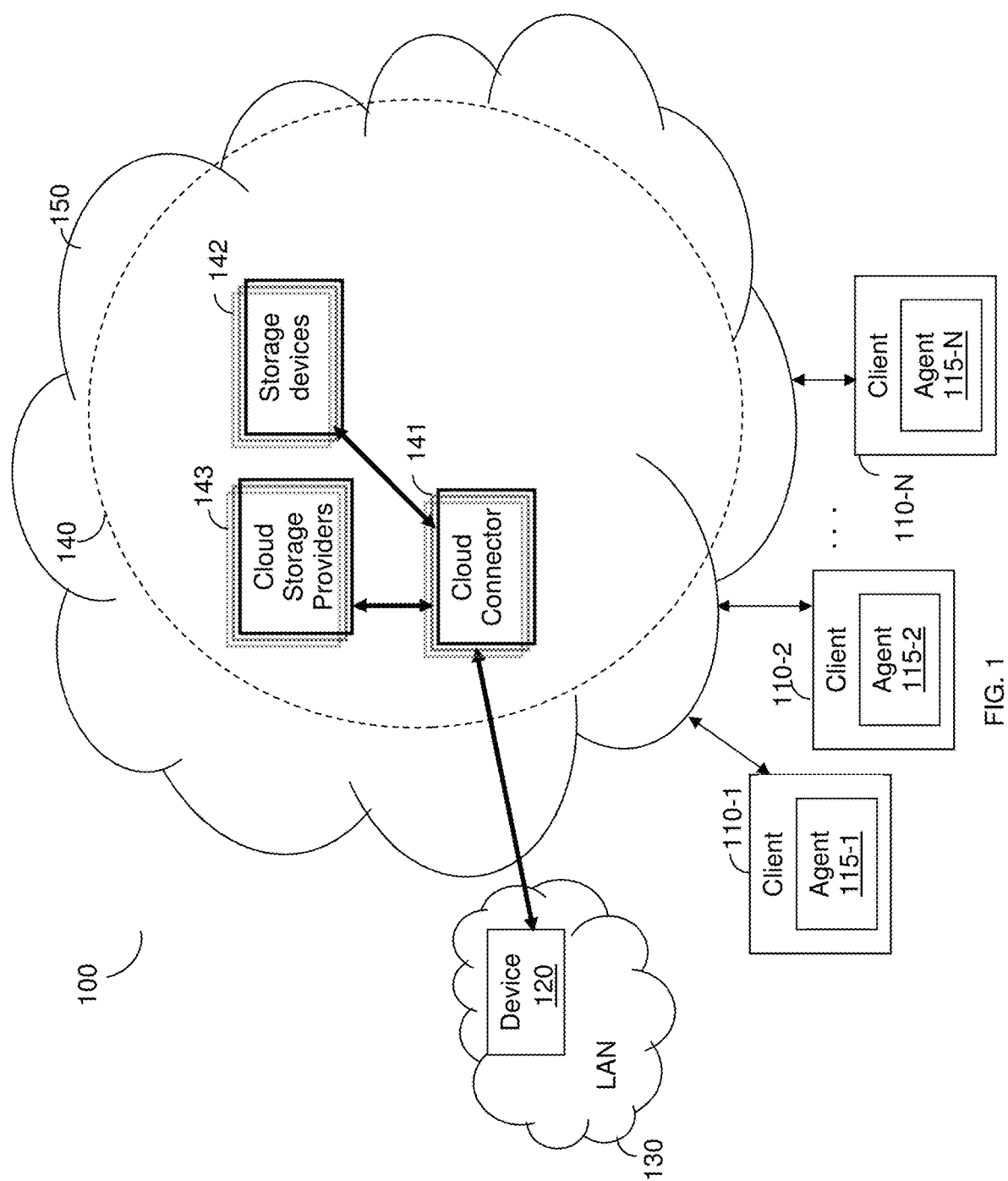
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example network diagram 100 utilized to describe the various disclosed embodiments. The network diagram 100 includes a plurality of client devices 110-1 through 110-N (hereinafter referred to collectively as client devices 110 or individually as a client device 110, merely for simplicity purposes) and a cloud storage service (CSS) 140 communicatively connected to a network 150. In an embodiment, each client device 110 is configured with an agent 115 that allows for sharing content such as files or folders using a secured link. The agent 115 may be, but is not limited to, a plug-in, an add-on, and so on. The agent 115 may be installed in a messaging software application (e.g., Outlook®), a web browser, or a dedicated application.

A user of the CSS 140 can securely share files with other user using the messaging application operated under the control of the agent 115. Specifically, the agent 115, according to one embodiment, allows for sharing files in the CSS 140 via emails by sending one or more links to the location of the shared files in the CSS 140 and performing one or more authentication steps via another security layer when accessing the files by the recipients of the emails' message.

More specifically, in an example embodiment, a user having access to documents in the CSS 140 sends a message to at least one designated recipient via a messaging application including the agent 115. The message includes attachments selected by the user, where the attachments include files or folders stored in, for example, the client device 110-1, the CSS 140, other storages, or a combination thereof. The agent 115 sends a list of the designated recipients to the CSS 140. If the CSS 140 does not include any of the attached files or folders, the agent 115 may be configured to upload or otherwise send the missing files or folders to the CSS 140. The agent 115 also requests, from the CSS 140, at least one link based on the designated recipients. The agent 115 receives the requested at least one link and replaces the attachments with the received links. Upon activation of one of the at least one link, the accessing user is authenticated using a security layer to ensure that the user is an authorized recipient.

The security layer is implemented or associated with any message sent to access the shared files, thereby ensuring that only the authorized user may access the files via the attachment link. The security layer may be realized through a plurality of verification techniques, authentication techniques, or both. Such techniques, discussed in greater detail herein below, include, but are not limited to, requesting a username and password combination, requesting a client certificate, requesting a PIN code or other verification string, sending an email notification that is personal for each recipient of an invitation, sending a verification challenge to an email address of the invitation recipient, and so on.

In an embodiment, the security layer for authenticating the intended recipient is sent through a secondary communication channel. Example authentication techniques for providing enhanced protection are described further in U.S. patent application Ser. No. 14/674,225, assigned to the common assignee, which is hereby incorporated by reference for all that it contains. In another embodiment, the authentication may be based on a user accounts directory.

It should be noted that the disclosed embodiments provide a security layer preventing unauthorized users from accessing content stored in the CSS 140. To this end, in an embodiment, a collaboration policy may be checked prior to compiling any message to the recipients and granting access to content stored in the CSS 140. The collaboration policy defines rules for allowing collaboration between users and governing which authentication should be used, access to the content and may include, but is not limited to, selectors such as a list of usernames; a list of email addresses; a list of domains, user groups, and so on; and a list of access restrictions such as time durations for granting access, access level such as read/write or read only, whether to allow download of contents from the CSS, employ further content protection mechanism such as watermarks and data redaction, and so on. In an embodiment, the collaboration policy may be based on the identity of recipients and/or specific content or specific properties of the shared files. In an embodiment, the collaboration policy may require warning the sender to check and reconsider whether they are indeed sharing the files with the intended recipient. In yet another embodiment, a natural language processing engine is employed prior to evaluating the collaboration to determine the topic, keywords, category or sensitivity level of the attachments based on the textual content of the files, the collaboration policy relying on the results of this processing. In yet another embodiment the collaboration policy may rely on the results of a machine learning engine to identify the contents of pictures for image type attachments, and to determine based on the contents of the image a subject, category or sensitivity level of the image attachments. In yet another embodiment, a machine learning engine such as a neural network is employed to learn over time attributes of typically shared files in aim to warn on anomalous sharing patterns which may indicate for example a data leakage attempt.

According to the disclosed embodiments, different authentication techniques are applied for internal users than for external users. The CSS 140, upon receiving a list of recipients, classifies the recipients as internal users or external users to the CSS 140. When a recipient attempts to access the shared folder, the recipient is authenticated based on his or her classification. In addition, the CSS 140, upon receiving a list of recipients, saves the lists for later authentications by the recipients.

It should be noted that, as described herein below with respect to the following example embodiments, an internal user is a user who has a verified account with the CSS (such as, for example, an employee of a company who owns the CSS).

Figure 2:
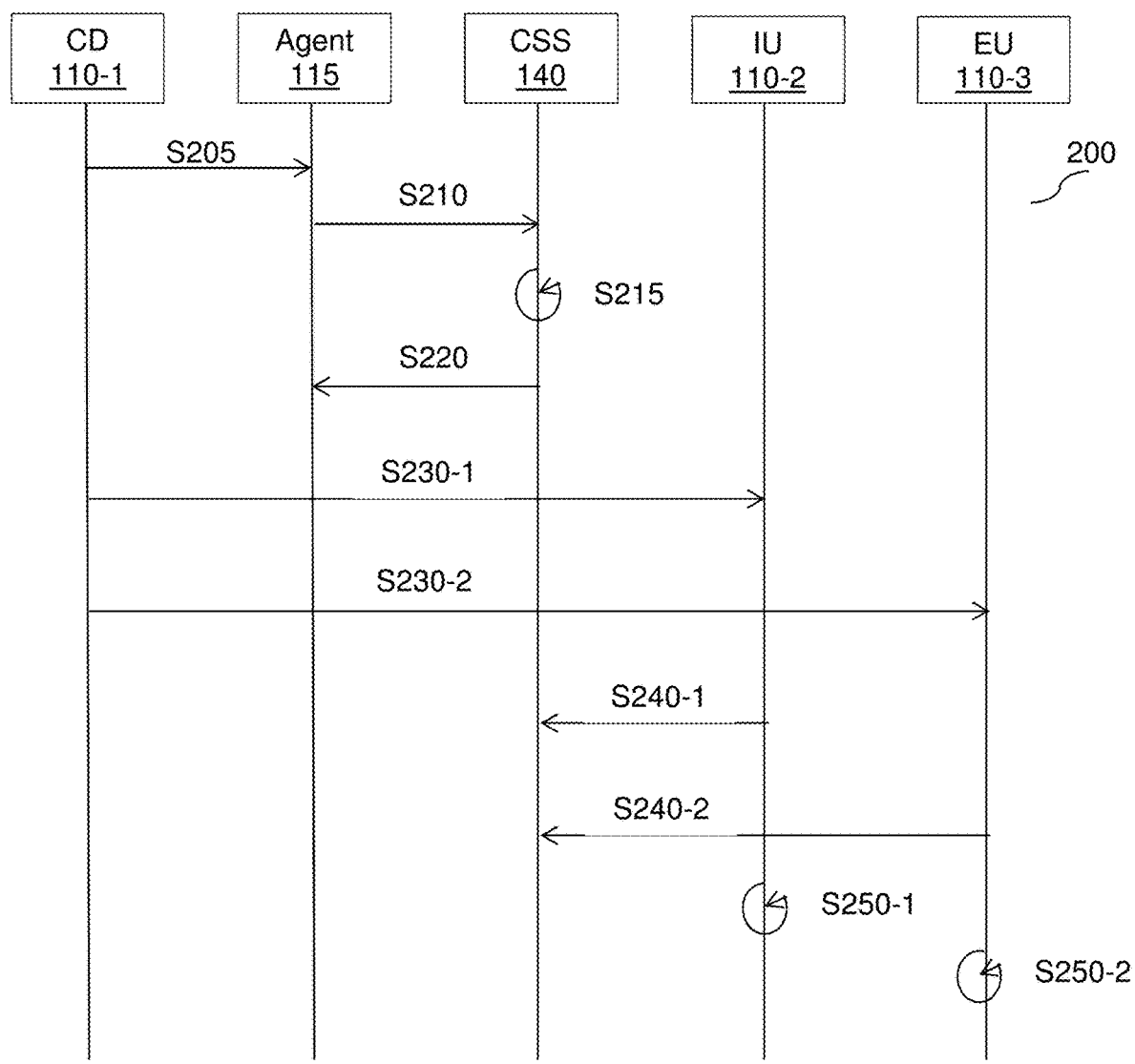
FIG. 2 is a sequence diagram illustrating a method for securely sharing content from a cloud storage according to an embodiment.

FIG. 2 is an example sequence diagram 200 illustrating a method for securely sharing content, via email, from a cloud storage according to an embodiment. In the embodiment shown in FIG. 2, a user of the client device 110-1 shares files with the client devices 110-2 and 110-3 of an internal user (IU) and external user (EU), respectively. The sharing of the files is facilitated by means of the agent 115 and the CSS 140. It should be noted that the agent 115 may be operable in the client device 110-1 and is shown as a separate entity merely for the purpose of simplifying the discussion.

At S205, a user of the client device 110-1 sends a message including one more attachments that is addressed to the internal user and external user (the recipients). The message can be created and sent using a messaging application.

At S210, the agent 115 is configured to capture the message before the message leaves the client device 110-1. The agent 115 is further configured to identify and send the attachments and the recipients in the created message to the CSS 140. The attachments may include files, folders, or both, that may or may not be stored in the CSS 140. The agent 115 may send file names of the attachments, upload the actual attachments, or both.

In an embodiment, the attachment files are uploaded to a new folder (hereinafter the "shared-folder") in the CSS. In a further embodiment, if the attachment files are already stored in the CSS, rather than uploading the files to the CSS, an invitation link to the existing files on the CSS may be sent. In another embodiment, if the attachment files are already stored in the CSS, rather than uploading the files to the CSS, a copy of the already stored file or a reference to the already stored file may be created in the shared-folder, and an invitation link to the shared-folder may be sent.

In an embodiment, the files are uploaded to the CSS using a de-duplicated synchronization protocol to reduce the latency and bandwidth consumption. An example for such a protocol can be found in U.S. patent application Ser. No. 12/641,559, assigned to the common assignee, which is hereby incorporated by reference for all that it contains. In certain embodiments, the file attachments are uploaded to the new folder in the CSS as the user attaches the files to the message.

In an embodiment, the recipients are designated by their email addresses. In the example sequence diagram 200, the two recipients are addresses of the email an external user (EU) and an internal user (IU) of the CSS. Specifically, the IU uses the client device 110-2 and the EU uses the client device 110-3. It should be noted that the example shown in FIG. 2 is described with respect to recipients using client devices 110 merely for simplicity purposes and without limitation on the disclosed embodiments. The recipients may utilize any devices capable of accessing the CSS 140 without departing from the scope of the disclosure.

At S215, a shared-folder containing the attachments (files) to be sent by the email is created in the CSS 140. The shared-folder can be accessed by any of the recipients (external user and internal user) upon their authentication. In another embodiment, S215 may include checking a collaboration policy to determine whether the attempted sharing violates the collaboration policy. When the collaboration policy is violated, no files are shared. Based on the email addresses of the recipients as well as email addresses of users registered in the system and groups thereof, the recipients may be further classified into external users and internal users. In an embodiment, different policies may be applied to internal and external users, as well as to users belonging to different groups. In certain implementations, the shared-folder or access to it may be automatically removed after, e.g., a predefined number of uses, a predefined amount of time, a predetermined event occurs, and so on. In an embodiment, the internal and external users and the link to the shared folder are saved in the CSS to later authenticate the recipients who attempt to access the link.

At S220, a link to the shared-folder is sent to the agent 115. In an embodiment, S220 may further include the agent 115 replacing the attachments in the message created in S205 with the link to the created folder.

At S230-1 and at S230-2, a message including the link to the shared-folder is sent from the client device 110-1 to the client devices 110-2 and 110-3 of the internal user and the external user, respectively. The message may be, but is not limited to, an email message. The link contains a unique invitation code having sufficient entropy to prevent brute force guessing of the link. The message is sent using a messaging application.

At S240-1 and S240-2, the internal user content recipient and the external user content recipient, respectively, attempt to access the shared-folder. In an embodiment, the attempt to access includes clicking on the link to the shared-folder included in one of the sent messages.

At S250-1 and S250-2, the internal user content recipient and the external user content recipient, respectively, are authenticated by the CSS 140. Different authentication procedures, described in more detail herein below, may be applied for the internal user and for the external user.

Figure 11:
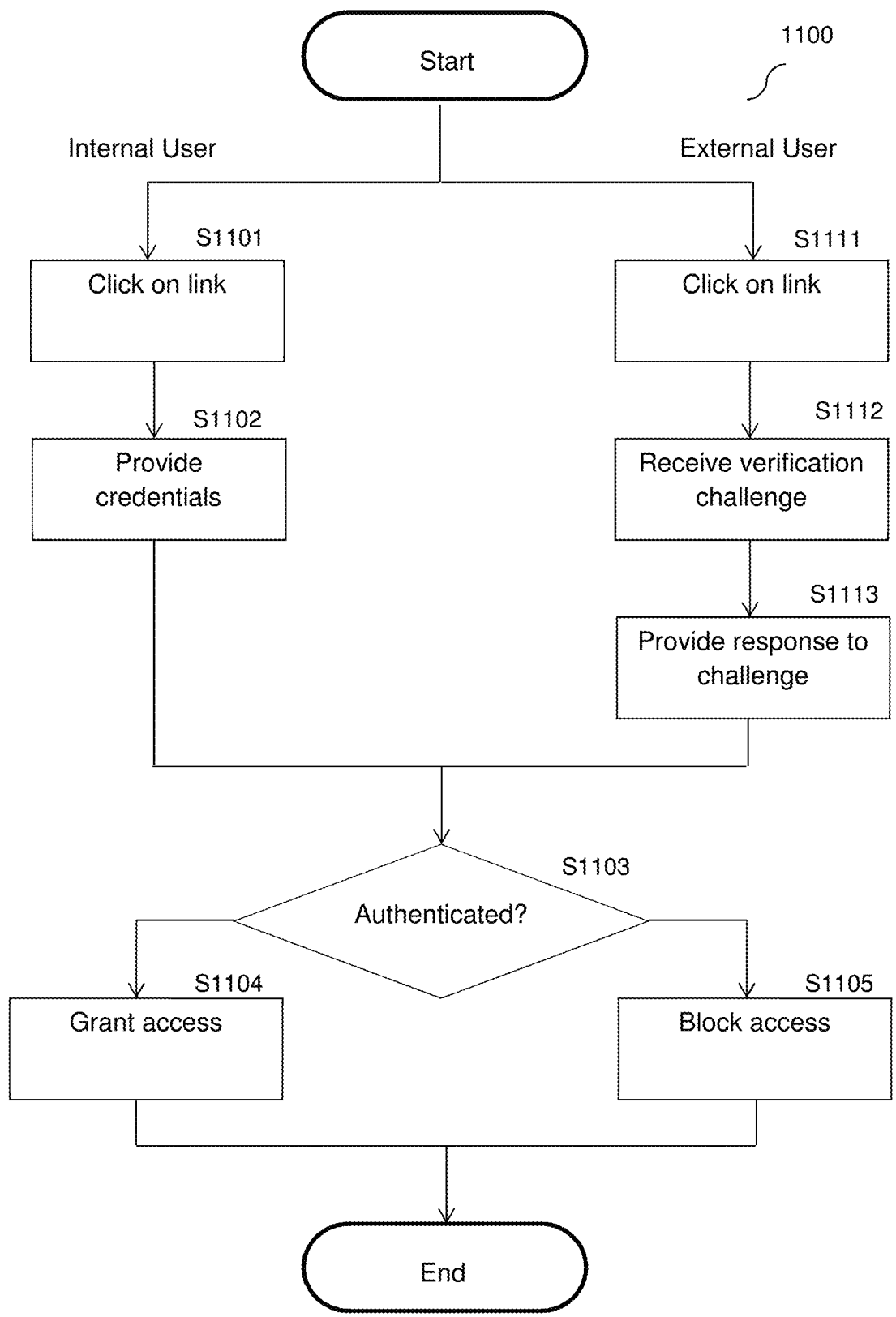
FIG. 11 is a flowchart showing the authentication stages of internal users and external users according to an embodiment.

Referring now to FIG. 11, which shows an example flowchart 1100 illustrating the different authentication procedures of internal users and external users according to an embodiment.

At S1101, an internal user accesses the folder by clicking on the link embedded in the received message. At S1102, the internal user is prompted to enter the login information (credentials). The login information may include, but is not limited to, a username, a password, or both. At S1103, it is checked if the internal user is authenticated and can access the shared folder. If so, at S1104, an access is granted to the shared folder. Otherwise, if the authentication is failed, at S1105, an access to the shared folder is blocked.

In an embodiment, the authentication of an internal user as performed at S1103 may be at least based on the invitation code and the user login information. For example, the user login information may be compared against information stored in the CSS 140 to determine if a user accessing the folder has provided the correct credentials. As another example, the provided login information can be utilized to authenticate the internal user using a single sign on (SSO) service.

At S1111, an external user accesses the folder by clicking on the link embedded in the received message. At S1112, the external user receives a verification challenge through the secondary communication channel. The secondary verification challenge may include, but is not limited to, sending a verification message containing a secret (e.g., a PIN code, a password, another URL and so on). In an embodiment, an external user may be required to provide the secret sent via the secondary verification challenge in order to confirm his or her identity before being authenticated. Example authentication techniques that can be used in the secondary verification are discussed in the above-referenced U.S. patent application Ser. No. 14/674,225.

In an embodiment, S1112 may further include prompting the internal user to enter an identifier for a secondary communication channel. Examples for such an identifier may include an email address, a telephone number, an IM user name, and the like.

In S1103, it is checked if the external user is authenticated and can access the shared folder. If so, in S1104, an access is granted to the shared folder. Otherwise, if the authentication is failed, in S1105, an access to the shared folder is blocked.

Figure 3:
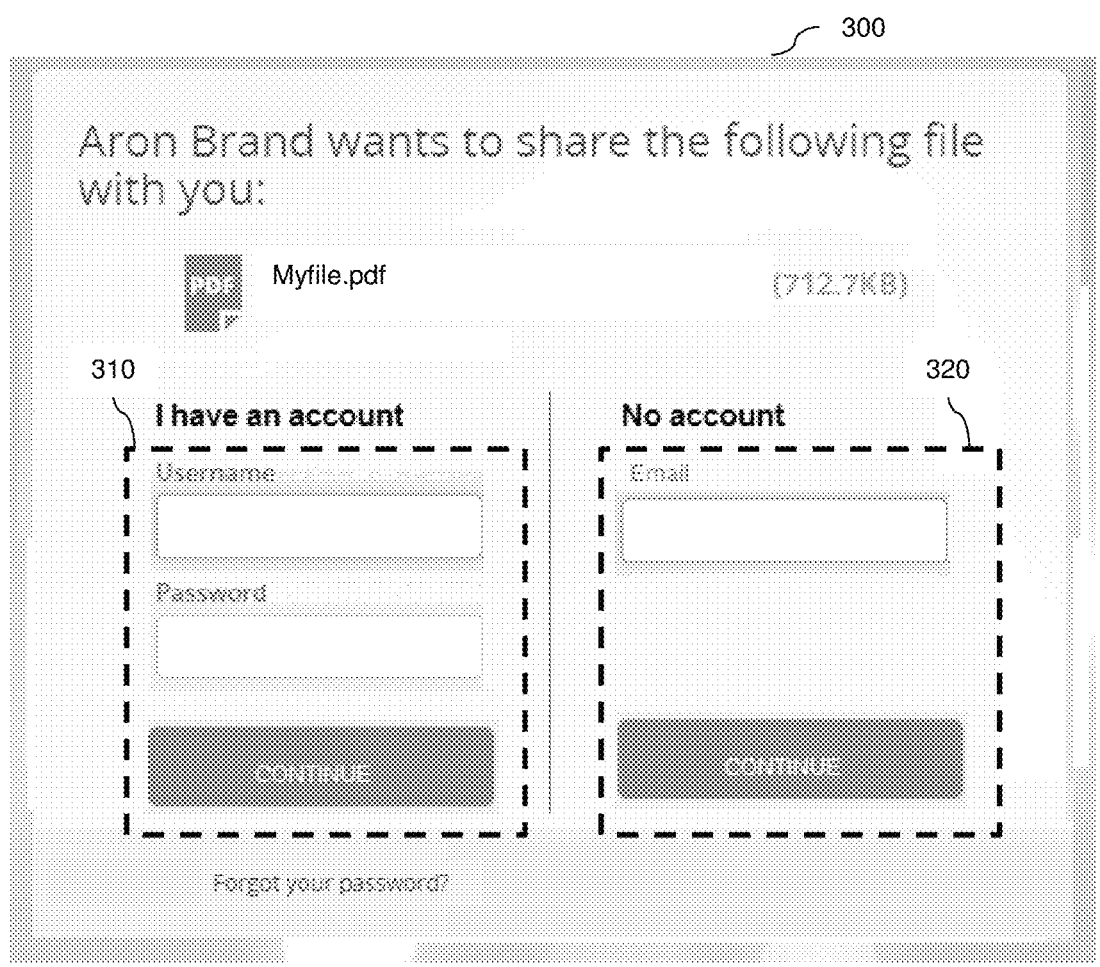
FIG. 3 is a screenshot illustrating an authentication page utilizing login information for internal users and a secondary verification for external users.

An example screenshot 300 illustrating an authentication page utilizing login information for internal users and a secondary verification for external users is seen in FIG. 3. The authentication page includes a verified account prompt 310 and a default prompt 320. The verified account prompt 310 may be utilized for internal users, while the default prompt 320 may be utilized for external users. In this embodiment, the verified account prompt 310 requests that a content recipient input a username and a password for a verified user account. The default prompt 320 requests that the content recipient input an email address. If the content recipient successfully provides a valid username and password combination, the content recipient is determined to be an internal user and may be redirected to a folder on the cloud storage containing the attachments. If the user instead provides a valid email address, the content recipient is determined to be an external user, a secondary verification message may be sent to the email address, and the external user may be prompted for a secret contained in the secondary verification message.

In another embodiment, the authentication may include prompting each content recipient for an email address. Based on the email address input by the content recipient, the content recipient may be identified as either an internal user or an external user. In an embodiment, if the email address is determined to be associated with a single sign on (SSO) server or other authentication protocol that controls access to the CSS containing the shared-folder, the content recipient may be determined to be an internal user and may be authenticated via the SSO server. In another embodiment, if the content recipient is determined to be an internal user, the internal user content recipient may be redirected to a login page. Upon successfully providing correct login information, the internal user content recipient may be authenticated. If the email address is determined to not be associated with the SSO server, the content recipient may be determined to be an external user, a secondary verification message may be sent to the email address, and the external user may be prompted for a secret contained in the secondary verification message.

Figure 4:
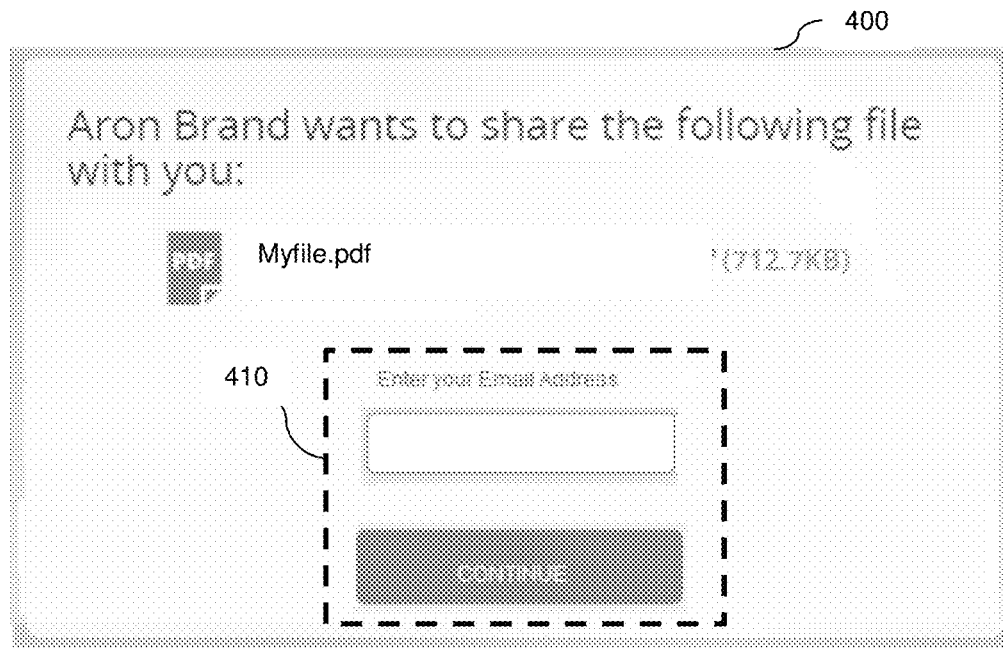
FIG. 4 is a screenshot illustrating an authentication page prompting each content recipient for an email address.

An example screenshot 400 illustrating an authentication page prompting each content recipient for an email address according to an embodiment is seen in FIG. 4. The verification challenge includes an email prompt 410. Inputs to the email prompt 410 are utilized to determine whether the content recipient is an internal user or an external user. The content recipient may be determined to be an internal user if the authentication protocol information input by the content recipient contains, e.g., a predetermined username, a predetermined domain name, a combination thereof, and so on. If the content recipient is determined to be an internal user, the content recipient may be authenticated via a login page or via an SSO server. If the content recipient is determined not to be an external user, a secondary verification may be sent via a separate message and the content recipient may be prompted for, e.g., a password contained in the separate message.

In yet another embodiment, authentication of internal users may include selection of a link to a login page or to an SSO service, while authentication of external users may require secondary verification. The login page may prompt the internal user for login information such as a username and password. The secondary verification may include, but is not limited to, sending a verification message containing a secret (e.g., a PIN code, a password, and so on) to an email address provided by the external user. In an embodiment, an external user may be required to provide the secret sent via the verification message in order to confirm his or her identity before being authenticated.

Figure 5:
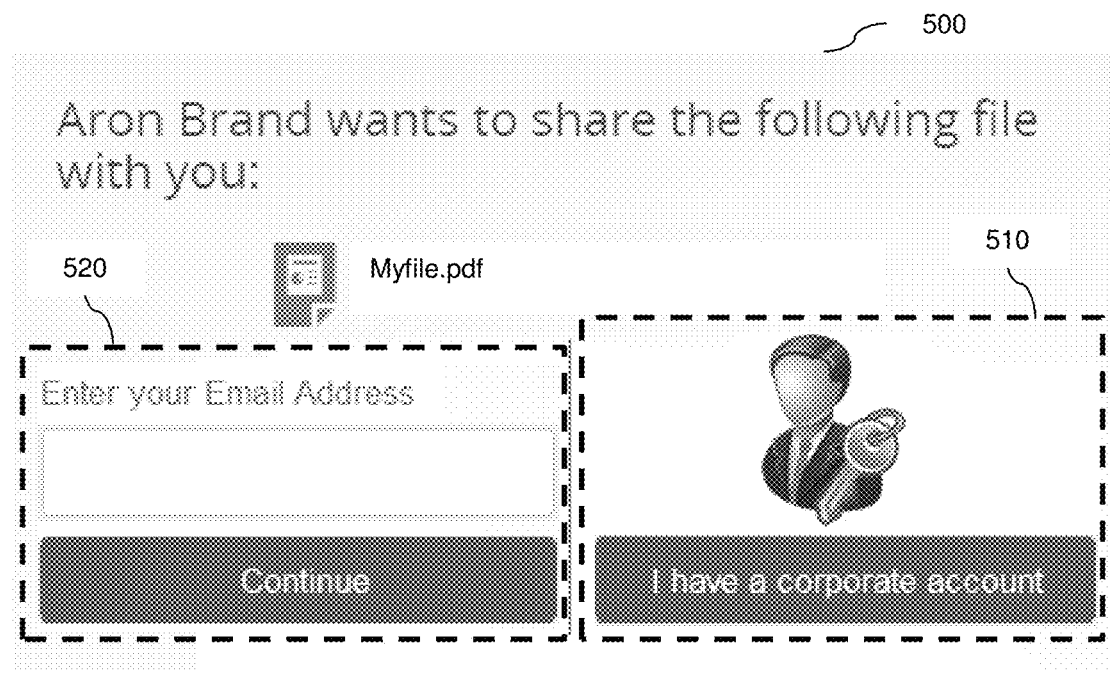
FIG. 5 is a screenshot illustrating an authentication page utilizing a link for internal users and a secondary verification for external users.

An example screenshot 500 illustrating an authentication page utilizing a link for internal users and a secondary verification for external users is seen in FIG. 5. The authentication page includes a link 510 and an email prompt 520. The link 510 may be for internal users, while the email prompt 520 may be for external users. In this embodiment, upon clicking the link 510, the internal user is redirected to a login page or to an SSO for authentication. The email prompt 520 requests that the external user provide an email address. If the external user provides a valid email address, a secondary verification email may be sent to the email address and the external user may be prompted for, e.g., a password contained in the secondary verification email.

Figure 6:
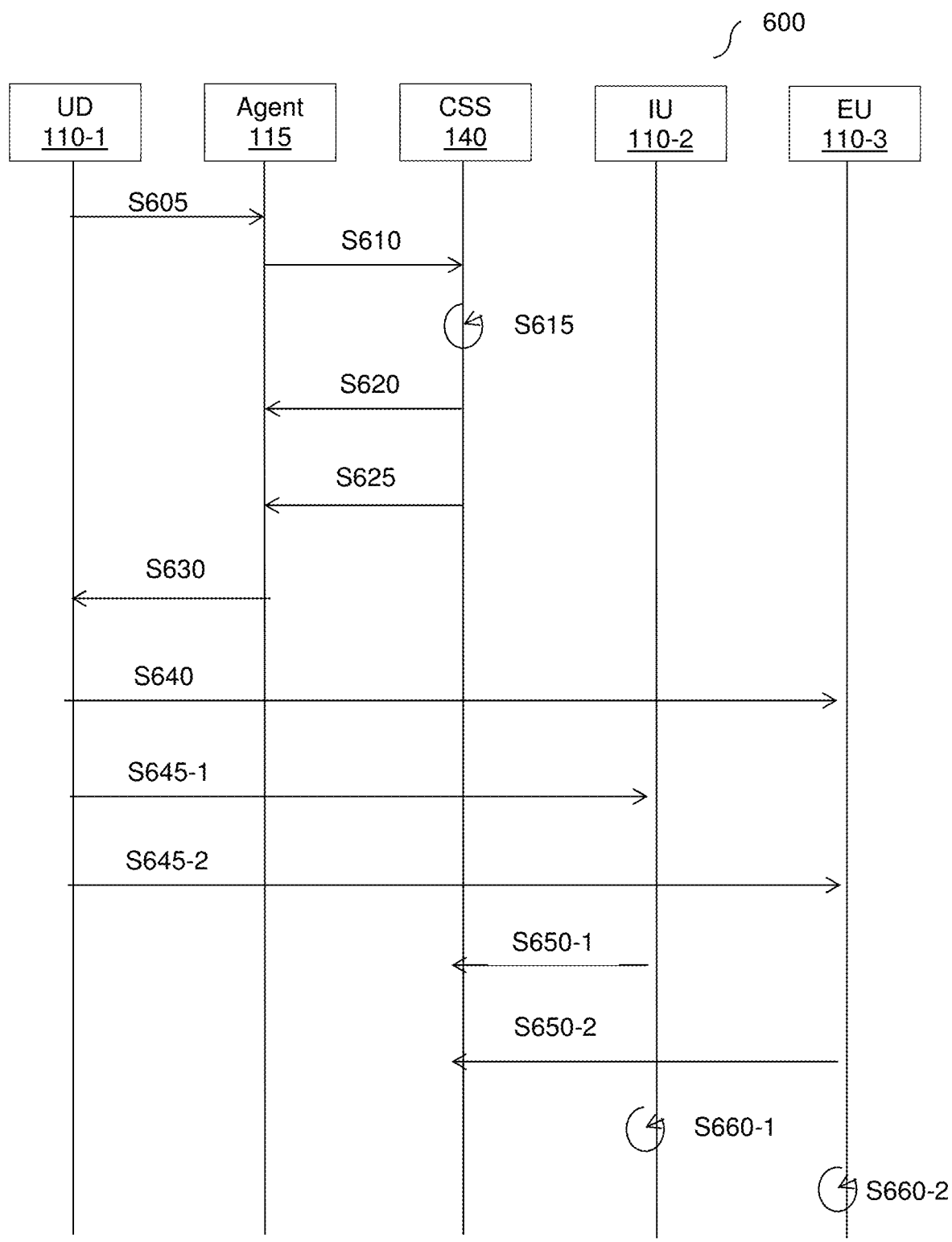
FIG. 6 is a sequence diagram illustrating a method for securely sharing content from a cloud storage using a secondary authentication according to an embodiment.

FIG. 6 is an example sequence diagram 600 illustrating a method for securely sharing content, via email, from a cloud storage using a secondary authentication according to an embodiment. In the embodiment shown in FIG. 6, a sharing user of a client device 110-1 attempts to share files in a CSS with an internal user (IU) content recipient and an external user (EU) content recipient of the CSS. The sharing of the files is facilitated by means of the agent 115 and the CSS 140. It should be noted that the agent 115 may be operable in the client device 110-1 and is shown as a separate entity merely for the purpose of simplifying the discussion.

At S605, a user of the client device 110-1 sends a message including one more attachments that is addressed to the internal user and to the external user (the recipients). The message can be created and sent using a messaging application.

At S610, the agent 115 is configured to capture the message before the message leaves the client device 110-1. The agent 115 is further configured to identify and send the attachments and the recipients in the created message to the CSS 140. The attachments may include files, folders, or both, that may or may not be stored in the CSS 140. The agent 115 may send file names of the attachments, the actual attachments, or both. If the attachment files are already stored in the CSS 140, an invitation link to the existing files on the CSS 140 may be sent, without need for uploading the files to the CSS 140.

At S615, a shared-folder containing the attachments (files) to be sent by the email is created in the CSS 140. The shared-folder can be accessed by any of the recipients (external user and internal user) upon their authentication. In an embodiment, S615 may include checking a collaboration policy to determine whether the attempted sharing violates the collaboration policy. When the collaboration policy is violated, no files are shared. Based on the email addresses of the recipients as well as email addresses of users registered in the system and groups thereof, the recipients may be further classified into external users and internal users. In an embodiment, different policies may be applied to internal and external users, as well as to users belonging to different groups. In certain implementations, the shared-folder or access to it may be automatically removed after, e.g., a predefined number of uses, a predefined amount of time, a predetermined event occurs, and so on. In an embodiment, the internal and external users and the link to the shared folder are saved in the CSS 140 to later authenticate the recipients who attempt to access the link In certain implementations, the shared-folder may be deleted after, e.g., a predefined number of uses, a predefined amount of time, a predetermined event occurs, and so on.

At S620, a link to the shared-folder is sent to the agent 115. At S625, a secret is generated by the CSS 140 and sent to the agent 115. The secret may be, but is not limited to, a PIN code, a password, and so on.

At S630, the agent 115 replaces the attachments in the message created in S605 with the link to the created folder. At S640, an authentication message is sent from the device 110-1 (by the messaging application) to at least the device 110-3 of the external user. In an embodiment, S640 may further include sending an authentication message to the device 110-2 of the internal user. The authentication message includes the secret required for subsequent authentication to the shared-folder.

At S645-1 and at S645-2, a message including the link to the shared-folder is sent from the client device 110-1 to the client devices 110-2 and 110-3 of the internal user and the external user, respectively. The message may be, but is not limited to, an email message. As noted above, the upload may be performed using a de-duplicated synchronization protocol discussed above.

At S650-1 and at S650-2, the internal user content recipient and the external user content recipient, respectively, attempt to access the shared-folder. In an embodiment, the attempt to access includes clicking on the link to the shared-folder.

At S660-1 and at S660-2, the internal user content recipient and the external user content recipient, respectively, are authenticated. The authentication may include sending each content recipient to an authentication page. Different authentication procedures, described in more detail herein below, may be applied for the internal user and for the external user.

In an embodiment, authentication of internal users may be based solely on login information inputs, while authentication of external users may require the external user to provide a secret. The login information may include, but is not limited to, a username and password.

Figure 7:
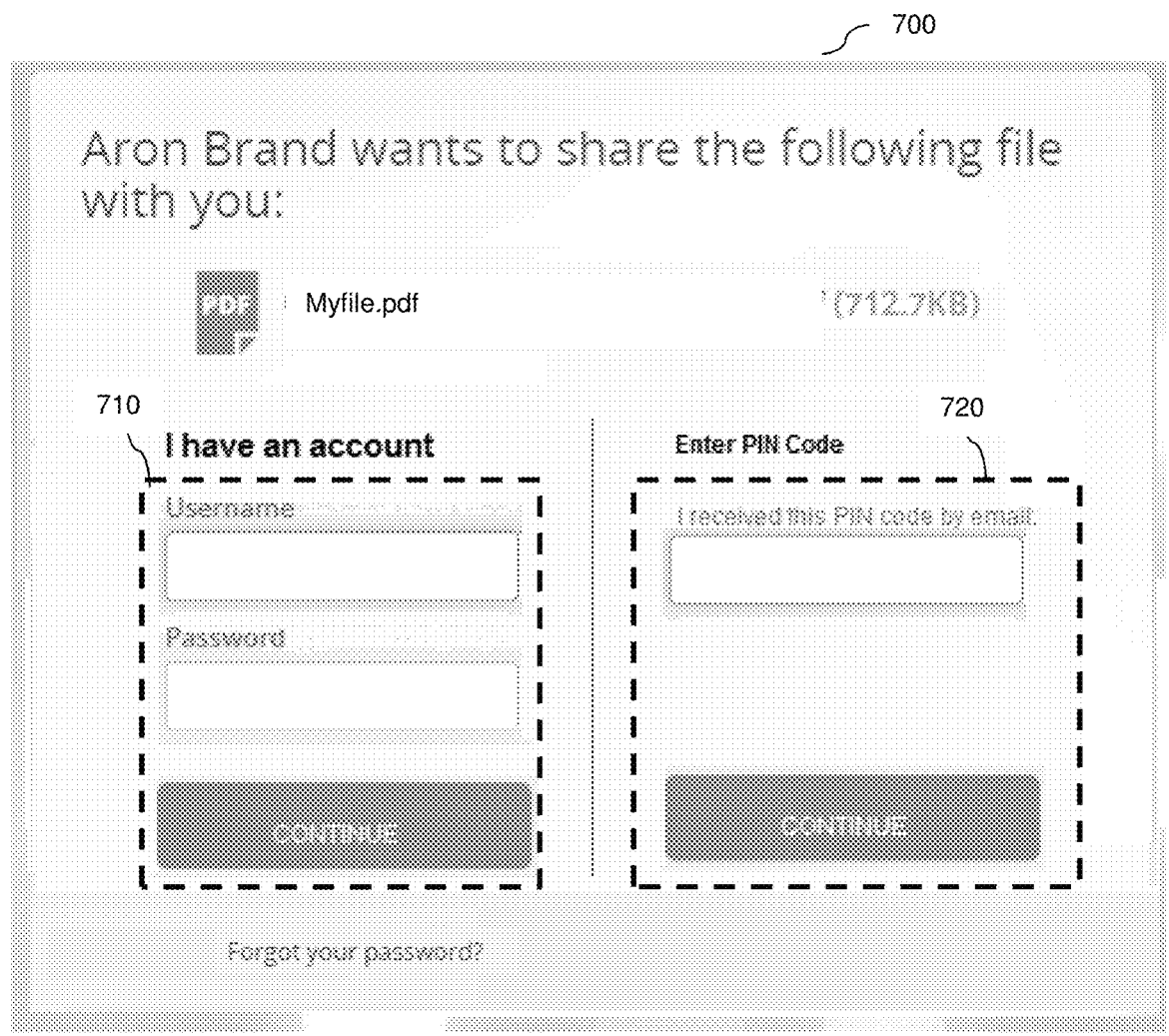
FIG. 7 is a screenshot illustrating an authentication page utilizing login information for internal users and a secret prompt for external users.

An example screenshot 700 illustrating an authentication page utilizing login information for internal users and a secret prompt for external users is seen in FIG. 7. The authentication page includes a login prompt 710 and a PIN code prompt 720. The login prompt 710 may be utilized for internal users, while the PIN code prompt 720 may be utilized for external users. In this embodiment, the login prompt 710 requests that an internal user input a username and a password for a verified user account. The PIN code prompt 720 requests that the external user input a PIN code received via a separate authentication message (e.g., an email). Upon successful input of valid login information or a valid PIN code, the content recipient is granted access to the shared-folder.

In another embodiment, authentication of content recipients may require each content recipient to provide a secret regardless of whether the content recipient is an internal user or an external user.

Figure 8:
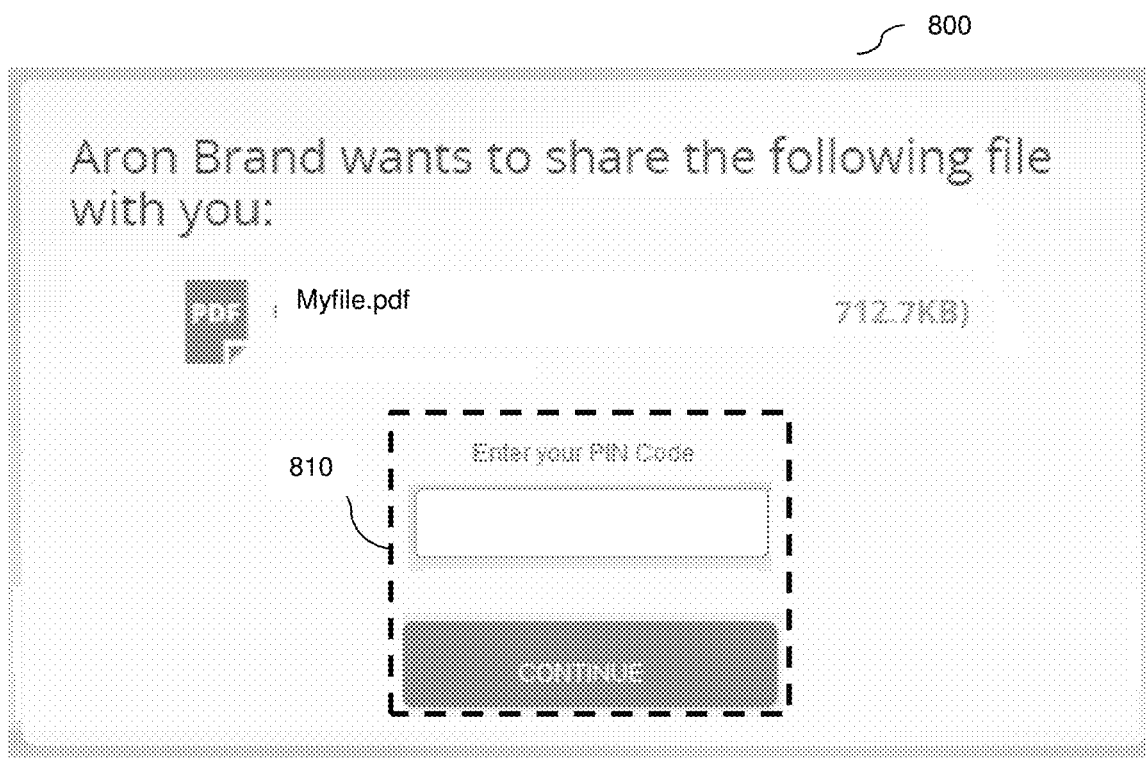
FIG. 8 is a screenshot illustrating an authentication page with a secret prompt for all content recipients.

An example screenshot 800 illustrating an authentication page with a secret prompt for all content recipients is seen in FIG. 8. The authentication page includes a secret prompt 810. The secret prompt 810 requests that the content recipient input a PIN code received via a separate message. If the content recipient successfully provides the correct PIN code, the content recipient may be granted access to the attachments.

Figure 9:
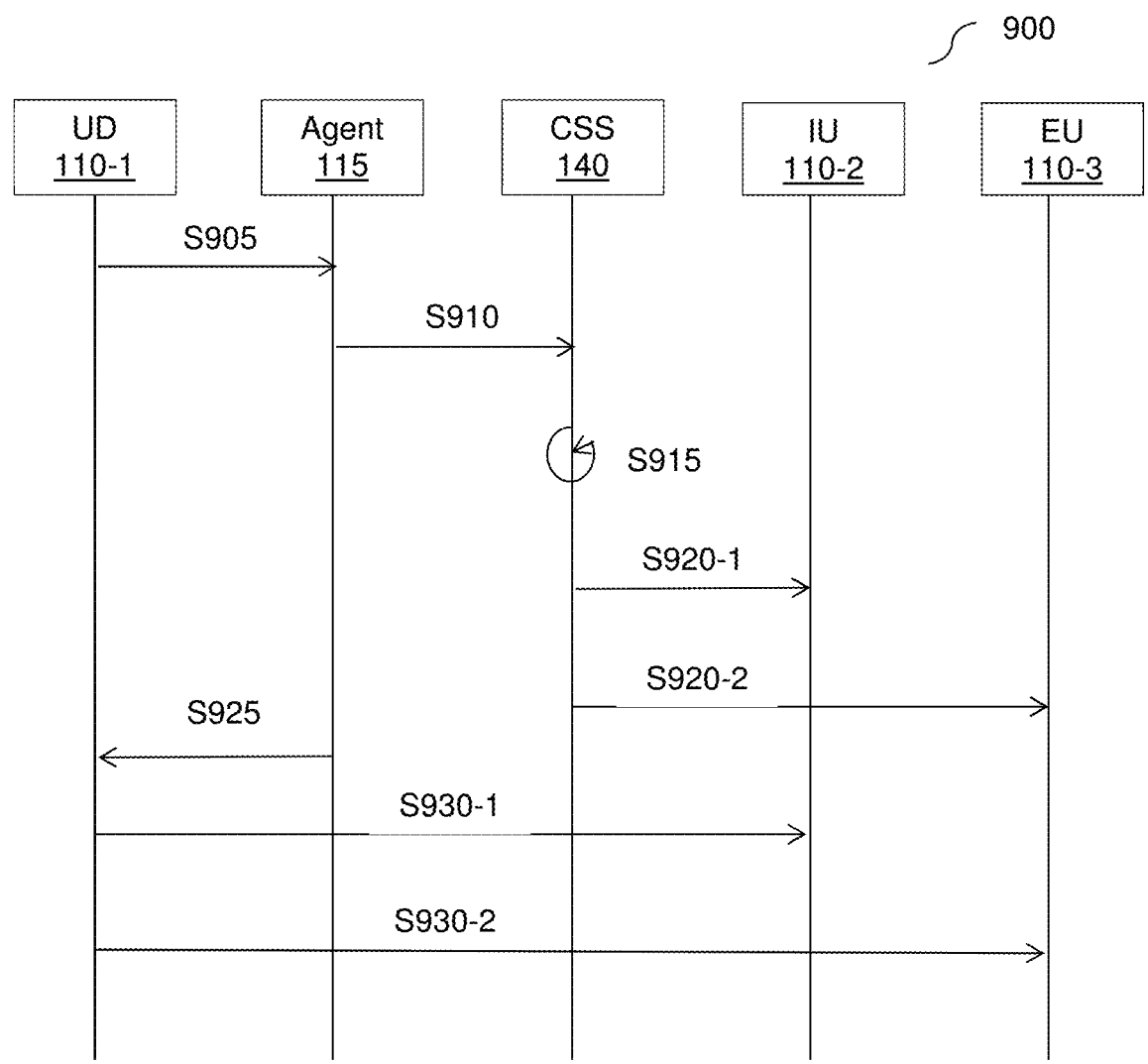
FIG. 9 is a sequence diagram illustrating a method for securely sharing content via email links from a cloud storage according to an embodiment.

FIG. 9 is an example sequence diagram 900 illustrating a method for securely sharing content via email from a cloud storage according to an embodiment. In the embodiment shown in FIG. 9, a user of the client device 110-1 shares files with the client devices 110-2 and 110-3 of an internal user (IU) and an external user (EU), respectively. The sharing of the files is facilitated by means of the agent 115 and the CSS 140. It should be noted that the agent 115 is operable in the client device 110-1 and it is shown as a separate entity merely for the purpose of simplifying the discussion.

At S905, a user of the client device 110-1 sends a message including one more attachments that is addressed to the IU and to the EU (the recipients). The message can be created and sent using a messaging application.

At S910, the agent 115 is configured to capture the message before the message leaves the client device 110-1. The agent 115 is further configured to identify and send the attachments and the recipients in the created message to the CSS 140. The attachments may include files, folders, or both, that may or may not be stored in the CSS 140. The agent 115 may send file names of the attachments, upload the actual attachments, or both.

At S915, a shared-folder containing the attachments (files) to be sent by the email is created in the CSS 140. The shared-folder can be accessed by any of the recipients (external user and internal user) upon their authentication. In an embodiment, based on the email addresses of the recipients, email addresses of users registered in the system, and groups thereof, S915 may further include determining which of the recipients are external users and which are internal users. Additionally, different policies to be applied to internal and external users, respectively, as well as to users belonging to different groups, may be identified. In certain implementations, the shared-folder or access to it may be automatically removed after, e.g., a predefined number of uses, a predefined amount of time, a predetermined event occurs, and so on.

At S920-1 and at S920-2, a link to the shared-folder is sent from the CSS 140 to each of the devices 110-2 and 110-3 of the internal user and the external user, respectively.

At S925, the agent 115 replaces the attachments in the message created at S905 with a notification message, e.g., "a link to the attached files has been sent to you in a separate email".

Figure 10:
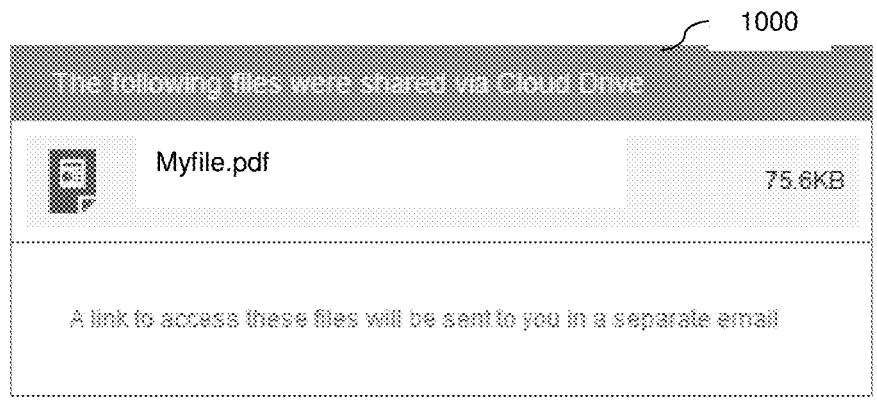
FIG. 10 is a screenshot illustrating a notification message indicating that attachments will be shared.

At S930-1 and at S930-2, a notification message indicating that attachments will be shared is sent from the agent 115 to the devices 110-2 and 110-3 of the internal user and the external user, respectively. An example screenshot 1000 illustrating a notification message indicating that attachments will be shared is seen in FIG. 10.

It should be noted that one internal user and one external user are shown as content recipients in FIGS. 2-10 merely for simplicity purposes and without limitation on the disclosed embodiments. Multiple internal users, multiple external users, or both, may be content recipients without departing from the scope of the disclosed embodiments. Furthermore, additional types of users which are not internal or external may exist. Additionally, the content recipients may be all internal users or all external users without departing from the scope of the disclosed embodiments.

It should be further noted that the embodiments shown in FIGS. 2-10 are described with respect to components such as those of the system of FIG. 1 merely for simplicity purposes and without limitation on the disclosed embodiments. The disclosed methods may be utilized with other systems without departing from the scope of the disclosure.

Figure 12:
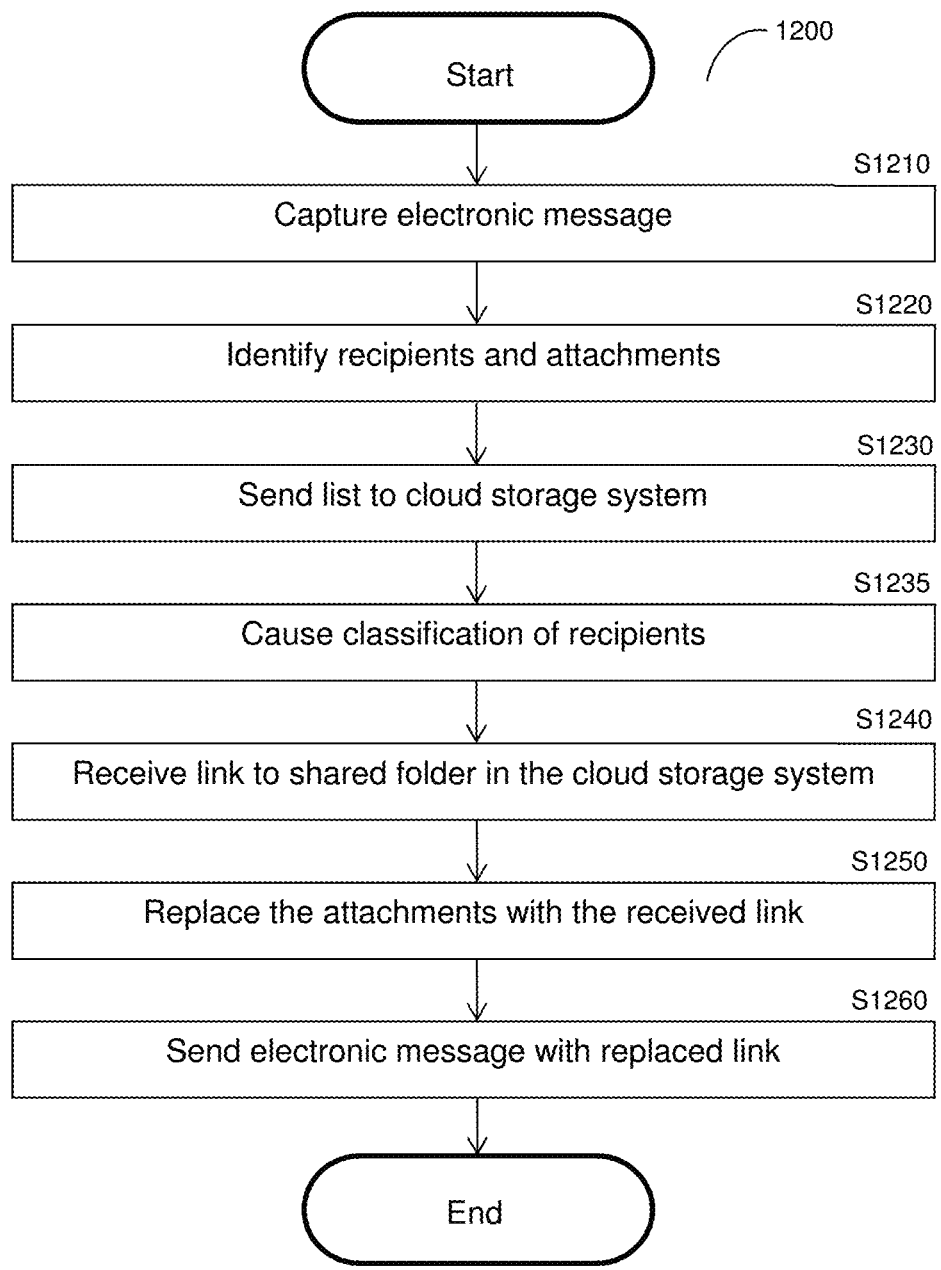
FIG. 12 is a flowchart illustrating a method for securely sharing files from a cloud storage according to an embodiment.

FIG. 12 is an example flowchart 1200 illustrating a method for securely sharing files from a cloud storage (e.g., the CSS 140) according to an embodiment. In an embodiment, the method may be performed by an agent (e.g., the agent 115) installed on a client device (e.g., the client device 110).

At S1210, an electronic message sent from the client device is captured prior to being delivered. The electronic message designates at least one recipient and includes at least one attachment. Each recipient may be designated based on, but not limited to, an address (e.g., an email address), a username, a real name, an identification number, a combination thereof, and any other identifier of the recipient. Each attachment may be, but is not limited to, a file or a folder.

At S1220, the electronic message is analyzed to identify the at least one designated recipient and the at least one attachment. In an embodiment, S1220 may further include determining whether sharing of the at least one attachment would violate a collaboration policy and, if so, denying access the at least one attachment.

At S1230, a list indicating the identified at least one recipient and at least one attachment is sent to the cloud storage system. In an embodiment, S1230 may further include sending any of the at least one attachment to the cloud storage system. In a further embodiment, S1230 may further include determining whether each attachment is stored in the cloud storage system and, if the attachment is not included in the cloud storage system, uploading the attachment to the cloud storage system. In another embodiment, S1230 may further include causing creation of a shared folder in the CSS, where the shared folder includes each identified attachment.

At optional S1235, classification of each identified recipient as either an internal recipient or an external recipient is caused. In an embodiment, the classification may be performed by the CSS. The classification may be based on an identifier used to designated the recipient and may include, but is not limited to, analyzing the identifier, comparing the designator to a predetermined set of internal users, and the like. As a non-limiting example of analyzing an identifier, if an identifier used to designate a recipient is an email address, the designator may be analyzed to identify a domain in the email address. If the domain matches a known domain associated with the CSS, the recipient may be classified as an internal recipient. In an embodiment, different authentication procedures may be utilized when an internal recipient attempts to access the at least one attachment in the CSS than for when an external recipient attempts to access the at least one attachment in the CSS At S1240, a link to a shared folder including the at least one attachment is received from the CSS.

At S1250, the at least one attachment in the electronic message is replaced with the received link.

At S1260, the electronic message with the replaced link is sent to the client device for sending to the at least one recipient. When a recipient attempts to access the at least one attachment by activating the replaced link, the CSS performs one or more authentication procedures. As noted above, which authentication procedures are performed for a recipient may be based on the classification of the recipient.

It should be noted that the disclosure has been described with a reference to a specific email where the files sharing is performed through emails. However, it should be appreciated, that links to the shared-folders can be sent through our communication means, such as SMS, IM, and the like.

It should also be noted that various embodiments described herein above are discussed with respect to sharing links with recipients using client devices (e.g., the client devices 110-2 and 110-3) merely for simplicity purposes and without limitation on the disclosed embodiments. The recipient may access the shared link using any device capable of viewing the contents of the shared files or folders without departing from the scope of the disclosure. Such a device is typically communicatively connected to a CSS (e.g., the CSS 140) through a network (e.g., the network 150).

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method implemented by a client device for securely sharing items from a cloud storage, comprising:
   capturing an electronic message sent by the client device, the electronic message designating at least one recipient, wherein the electronic message includes at least one attachment;
   identifying the at least one attachment and the at least one recipient designated in the electronic message;
   sending, to a cloud storage system (CSS), a list indicating the identified at least one recipient;
   receiving by the client device, from the CSS, a link to a shared folder which points to the shared folder at the folder level and which opens the shared folder upon activation of the link and successful authentication of the at least one recipient in response thereto so as to enable access to the shared folder by the at least one recipient, wherein the shared folder is in the CSS and wherein the access enabled is to at least access content in the shared folder by each of the at least one recipient in accordance with access restrictions for each of the at least one recipient in accordance with a collaboration policy;
   replacing, in the electronic message, the at least one attachment with the received link;
   uploading, to the shared folder, at least one of the at least one attachment; and
   sending, to the at least one recipient, the electronic message with the replaced link, wherein an authentication procedure is applied for each one of the at least one recipient upon activation of the replaced link by the recipient, wherein the authentication procedure, based upon a determined sensitivity level of the at least one attachment, for each of the at least one recipient who is an internal user of the CSS in that such internal user has a verified account with the CSS is a first type of authentication procedure and wherein the authentication procedure for each of the at least one recipient who is an external user of the CSS in that such external user does not have a verified account with the CSS is a second type of authentication procedure different from the first type of authentication procedure and wherein the second type of authentication includes sending a verification challenge from the CSS using a secondary channel of communication.

2. The method of claim 1, further comprising:
   determining, for each attachment, whether the attachment is stored in the CSS, wherein each uploaded attachment is not determined as stored in the CSS.

3. The method of claim 2, further comprising:
   instructing the CSS to store, in the shared folder, one of: a copy of, or a reference to, at least another one of the at least one attachments that is determined as stored in the CSS without uploading the at least another one of the at least one attachments.

4. The method of claim 1, wherein each uploaded attachment is uploaded via a de-duplicated synchronization protocol.

5. The method of claim 1, wherein the first type of authentication procedure includes at least one of: requesting a username and password combination, requesting a client certificate, requesting a personal identification number code, and sending a personal notification to each identified internal recipient.

6. The method of claim 1, wherein the at least one attachment is a folder.

7. A system for securely sharing files from a cloud storage, comprising:
   a processing circuitry; and
   a memory, the memory containing instructions that, when executed by the processing circuitry, configure the system to:
   capture an electronic message sent by a client device, the electronic message designating at least one recipient, wherein the electronic message includes at least one attachment;
   identify the at least one attachment and the at least one recipient designated in the electronic message;
   send, to a cloud storage system (CSS), a list indicating the identified at least one recipient;
   upload, to the shared folder, at least one of the at least one attachment;
   send from the CSS to each one of the at least one recipient, a link to a shared folder which points to the shared folder at the folder level and which opens the shared folder upon activation of the link and successful authentication of the at least one recipient in response thereto so as to enable access to the shared folder by the at least one recipient, wherein the shared folder is in the CSS and wherein the access enabled is to at least modify access content in the shared folder by each of the at least one recipient in accordance with access restrictions for each of the at least one recipient in accordance with a collaboration policy, wherein an authentication procedure, based upon a determined sensitivity level of the at least one attachment, is applied for each one of the at least one recipient upon activation of the link by the recipient, wherein the authentication procedure for each of the at least one recipient who is an internal user of the CSS in that such internal user has a verified account with the CSS is a first type of authentication procedure and wherein the authentication procedure for each of the at least one recipient who is an external user of the CSS in that such external user does not have a verified account with the CSS is a second type of authentication procedure different from the first type of authentication procedure;
   replace, in the electronic message, the at least one attachment with a notification indicating that a link to the at least one of the at least one attachment is contained in a separate electronic message; and
   send, to the at least one recipient, the electronic message with the notification.

8. The system of claim 7, wherein the system is further configured to:
   determine, for each attachment, whether the attachment is stored in the CSS; and
   upload, to the CSS, each attachment that is determined as not stored in the CSS.

9. The system of claim 7, wherein each uploaded attachment is uploaded via a de-duplicated synchronization protocol.

10. The system of claim 7, wherein the first type of authentication procedure includes at least one of: requesting a username and password combination, requesting a personal identification number code, and sending a personal notification to each identified recipient, and the second type of authentication procedure includes sending a verification challenge to an email address of each identifier recipient.

11. A method for securely sharing items from a cloud storage, comprising:
   receiving, from a client device, a list of recipients for an electronic message;
   creating a shared folder;
   sending, to the client device, a link to the shared folder which points to the shared folder at the folder level and which opens the shared folder upon activation of the link and successful authentication of at least one of the recipients in response thereto so as to enable access to the shared folder by the at least one of the recipients and wherein the access enabled is to at least access in the shared folder by each of the at least one of the recipients in accordance with access restrictions for each of the at least one recipients in accordance with a collaboration policy;
   receiving, from a user device, at least one identifier, wherein the at least one identifier is received in response to a user of the user device accessing the sent link;
   determining, based on the at least one identifier, whether the user is among the list of recipients; and
   authenticating, based on the received at least one identifier, the user of the user device, wherein the authentication procedure, based upon a determined sensitivity level of the at least one attachment, for each of the at least one recipient who is an internal user of the cloud storage in that such internal user has a verified account with the cloud storage is a first type of authentication procedure and wherein the authentication procedure for each of the at least one recipient who is an external user of the cloud storage in that such external user does not have a verified account with the cloud storage is a second type of authentication procedure different from the first type of authentication procedure, wherein the second type of authentication includes sending a challenge via a secondary communication channel and receiving a corresponding response to the sent challenge.

12. The method of claim 11, further comprising:
   checking, based on the list of recipients, the collaboration policy to determine if the collaboration policy has been violated, wherein the shared folder is created when the collaboration policy has not been violated.

13. The method of claim 11, wherein the first type of authentication is based on a user accounts directory.

14. The method of claim 11, wherein the at least one identifier includes at least one of: an email address, and a username.

15. A system for securely sharing files from a cloud storage, comprising:
   a processing circuitry; and
   a memory, the memory containing instructions that, when executed by the processing circuitry, configure the system to:
   receive, from a client device, a list of recipients for an electronic message;
   create a shared folder;
   send, to the client device, a link to the shared folder, the link pointing to the shared folder at the folder level and which opens the shared folder upon activation of the link and successful authentication of the at least one recipient in response thereto so as to enable access to the shared folder by the at least one recipient and wherein the access enabled is to at least access in the shared folder by each of the at least one of the recipients in accordance with access restrictions for each of the at least one recipients in accordance with a collaboration policy;
   receive, from a user device, at least one identifier, wherein the at least one identifier is received in response to a user of the user device accessing the sent link;
   determine, based on the at least one identifier, whether the user is among the list of recipients; and
   authenticate, based on the received at least one identifier, the user of the user device, wherein the authentication procedure, based upon a determined sensitivity level of the at least one attachment, for each of the at least one recipient who is an internal user of the cloud storage in that such internal user has a verified account with the cloud storage is a first type of authentication procedure and wherein the authentication procedure for each of the at least one recipient who is an external user of the cloud storage in that such external user does not have a verified account with the cloud storage is a second type of authentication procedure different from the first type of authentication procedure, wherein the second type of authentication includes sending a challenge via a secondary communication channel and receiving a corresponding response to the sent challenge.

16. The system of claim 15, wherein the system is further configured to:
   determine for each recipient based on the collaboration policy, at least one of: an access restriction or an authentication method, where the access restriction may be to prevent the collaboration entirely.

17. The system of claim 15, wherein the first type of authentication is based on a user accounts directory.

18. The system of claim 15, wherein the at least one identifier includes at least one of: an email address, and a username.

* * * * *